(12) United States Patent
Watanabe et al.

(10) Patent No.: US 10,867,624 B1
(45) Date of Patent: Dec. 15, 2020

(54) MAGNETIC HEAD AND DISK DEVICE WITH HEAT ACTUATORS

(71) Applicants: Kabushiki Kaisha Toshiba, Tokyo (JP); Toshiba Electronic Devices & Storage Corporation, Tokyo (JP)

(72) Inventors: Toru Watanabe, Kawasaki Kanagawa (JP); Masami Yamane, Kawasaki Kanagawa (JP); Gaku Koizumi, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/718,548

(22) Filed: Dec. 18, 2019

(30) Foreign Application Priority Data

Sep. 6, 2019 (JP) .................................. 2019-163226

(51) Int. Cl.
*G11B 5/31* (2006.01)
*G11B 5/60* (2006.01)
*G11B 5/00* (2006.01)

(52) U.S. Cl.
CPC .......... *G11B 5/3136* (2013.01); *G11B 5/6076* (2013.01); *G11B 5/6082* (2013.01); *G11B 2005/0021* (2013.01)

(58) Field of Classification Search
CPC ......... G11B 21/02; G11B 23/50; G11B 21/21; G11B 5/40; G11B 7/122; G11B 5/60; G11B 5/00; G11B 5/31
See application file for complete search history.

(56) References Cited

U.S. PATENT DOCUMENTS

| | | | | |
|---|---|---|---|---|
| 6,347,983 B1 * | 2/2002 | Hao | ....................... | B24B 37/04 29/603.09 |
| 7,088,543 B2 * | 8/2006 | Satoh | ................... | G11B 5/4853 360/75 |
| 7,133,254 B2 * | 11/2006 | Hamann | .................. | G11B 5/10 360/125.74 |
| 8,098,450 B2 * | 1/2012 | Baumgart | ............ | G11B 5/6005 360/25 |
| 8,730,608 B1 * | 5/2014 | Van Eaton | ............. | G11B 5/607 360/59 |
| 8,804,272 B1 * | 8/2014 | Dakroub | .............. | G11B 5/6005 360/46 |

(Continued)

FOREIGN PATENT DOCUMENTS

JP   2013-4122 A   1/2013

*Primary Examiner* — Brian E Miller
(74) *Attorney, Agent, or Firm* — White & Case LLP

(57) ABSTRACT

According to one embodiment, a recording head includes a main pole and a first shield. The first shield includes a distal end portion projecting from an air bearing surface of a slider. The distal end portion includes a distal end surface which includes a first shield edge opposing the main pole with a write gap and a second shield edge spaced apart from the first shield edge in a trailing end side. A distal end portion of the main pole projects from the distal end surface. When a length between the distal end portion of the main pole and the second shield edge is L1, the projection amount of the distal end portion of the main pole is h2, a flying pitch is D1, and a protrusion pitch angle is D2, the recording head satisfies a relationship of: $L1 \geq h2/(D1+D2)$.

12 Claims, 15 Drawing Sheets

(56) References Cited

U.S. PATENT DOCUMENTS

| | | | |
|---|---|---|---|
| 8,953,275 B2 * | 2/2015 | Chou | G11B 5/607 360/31 |
| 9,607,641 B1 * | 3/2017 | Ramakrishnan | G11B 5/607 |
| 9,928,873 B1 * | 3/2018 | Liu | G11B 21/21 |
| 2004/0012894 A1 * | 1/2004 | Pust | G11B 5/332 360/319 |
| 2005/0024775 A1 * | 2/2005 | Kurita | G11B 5/6064 360/234.3 |
| 2005/0213250 A1 * | 9/2005 | Kurita | G11B 5/6082 360/234.4 |
| 2006/0285248 A1 * | 12/2006 | Pust | G11B 5/3116 360/128 |
| 2007/0035881 A1 * | 2/2007 | Burbank | G11B 5/6064 360/234.3 |
| 2007/0230034 A1 * | 10/2007 | Kondo | G11B 5/582 360/78.04 |
| 2008/0192377 A1 * | 8/2008 | Lee | G11B 5/6064 360/59 |
| 2009/0262460 A1 * | 10/2009 | Hanchi | G11B 5/6064 360/235.4 |
| 2009/0323227 A1 * | 12/2009 | Zheng | G11B 5/314 360/313 |
| 2011/0267715 A1 * | 11/2011 | Heim | G11B 5/3133 360/59 |
| 2012/0113207 A1 * | 5/2012 | Zheng | G11B 5/6076 347/209 |
| 2012/0120519 A1 * | 5/2012 | Kunkel | G11B 20/10 360/59 |
| 2012/0327529 A1 * | 12/2012 | Hutchinson | G11B 5/607 360/31 |
| 2013/0188273 A1 * | 7/2013 | Miyamoto | G11B 5/607 360/59 |
| 2014/0269838 A1 * | 9/2014 | MacKen | G11B 5/607 374/183 |
| 2015/0103430 A1 * | 4/2015 | Gadbois | G11B 5/4853 360/59 |
| 2015/0138671 A1 * | 5/2015 | Sasaki | G11B 5/127 360/123.02 |
| 2016/0232931 A1 | 8/2016 | Lou et al. | |
| 2017/0032810 A1 * | 2/2017 | Macken | G11B 5/4853 |
| 2017/0047089 A1 | 2/2017 | Rajauria et al. | |

\* cited by examiner

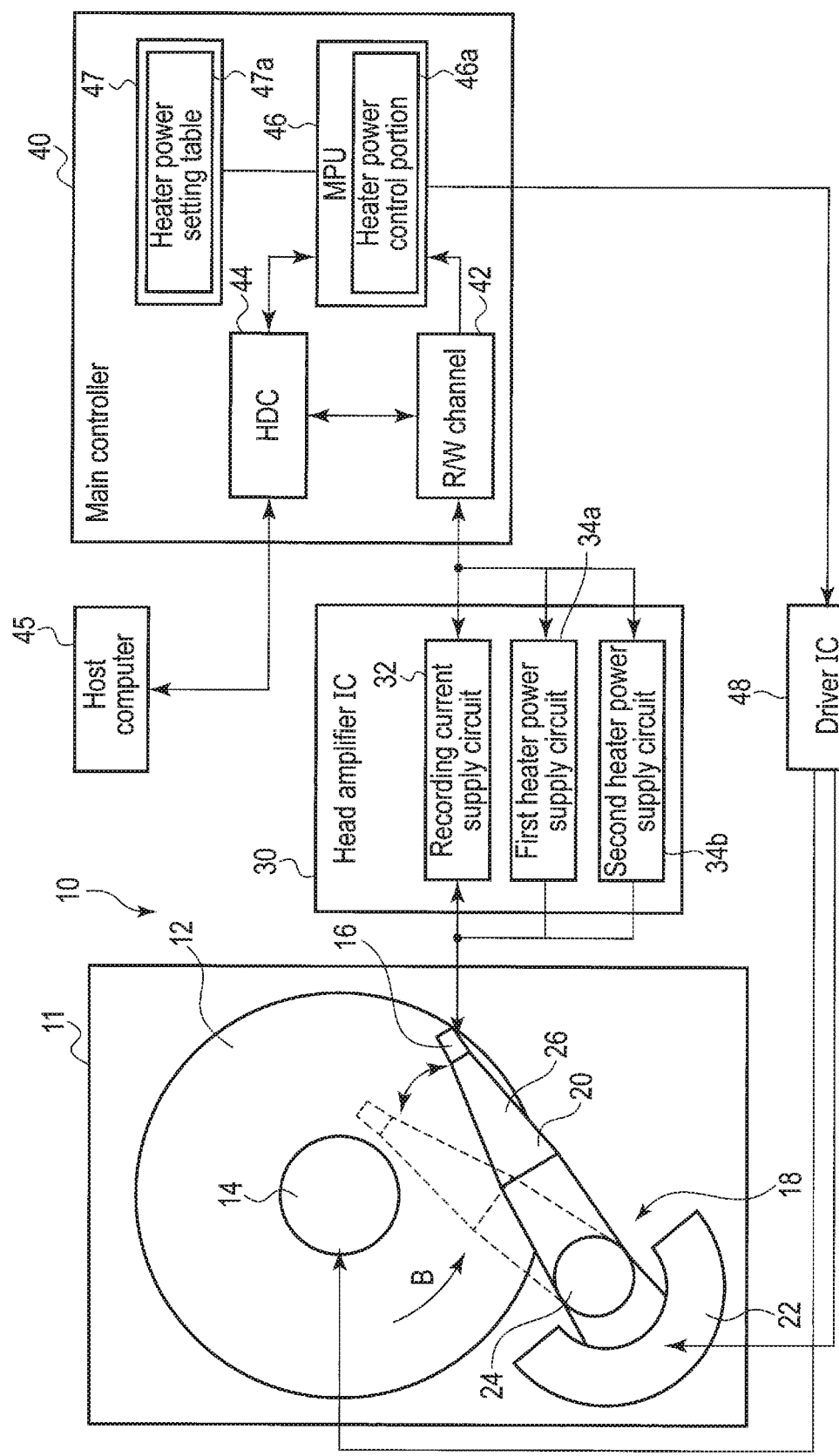
F I G. 1

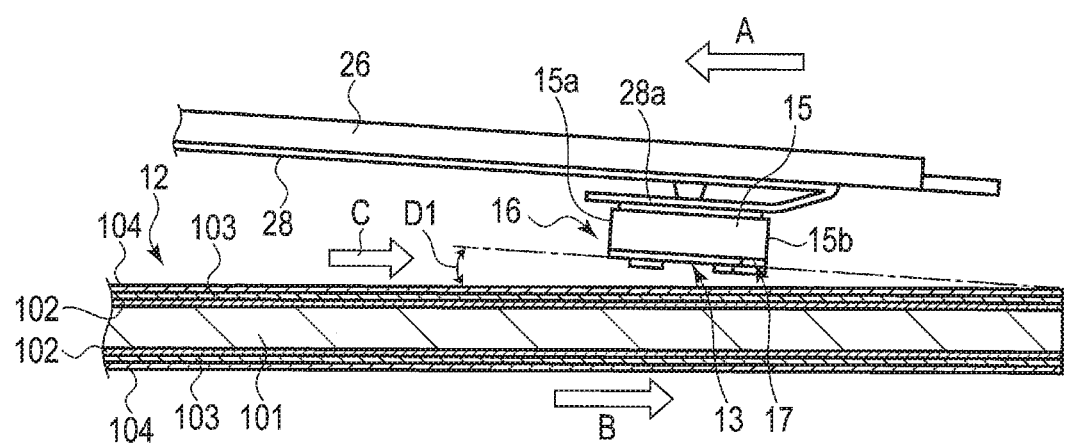
F I G. 2

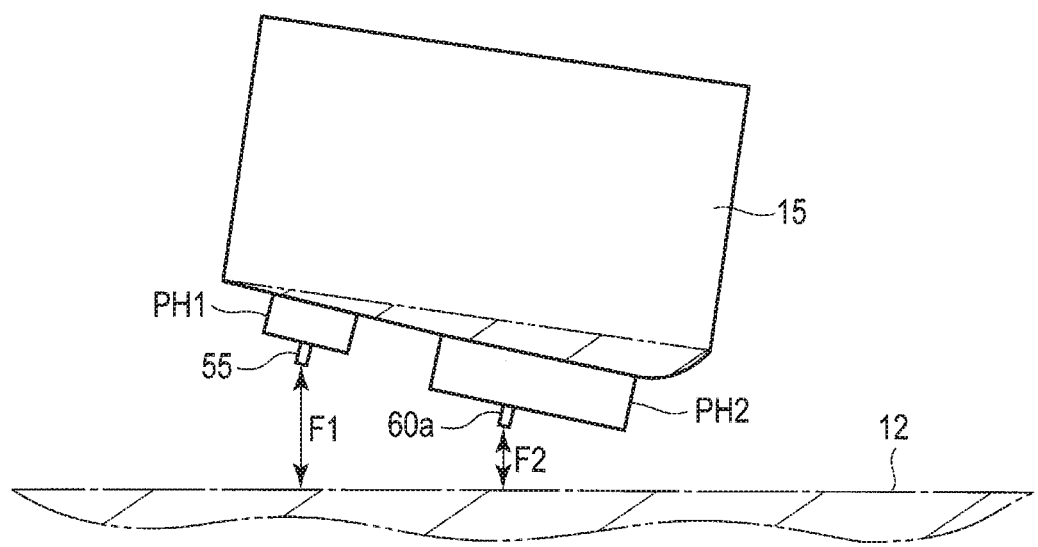
F I G. 12
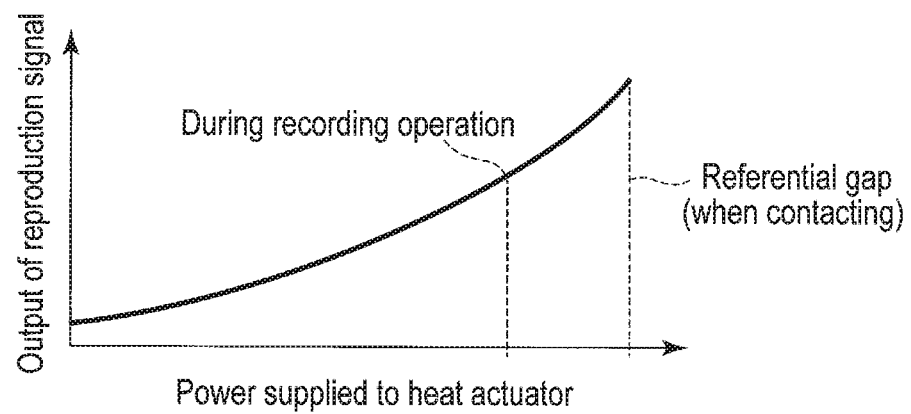
F I G. 13

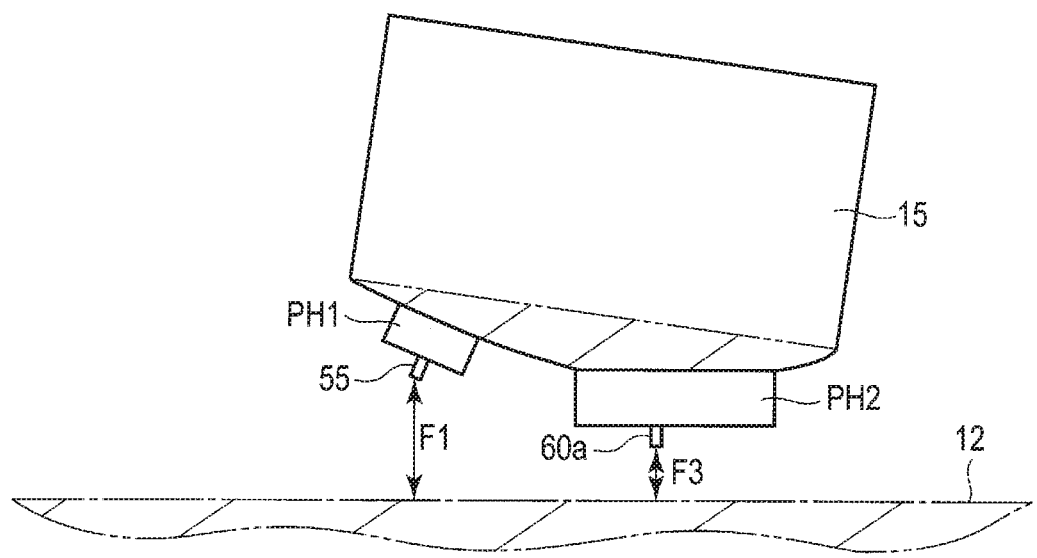
F I G. 14
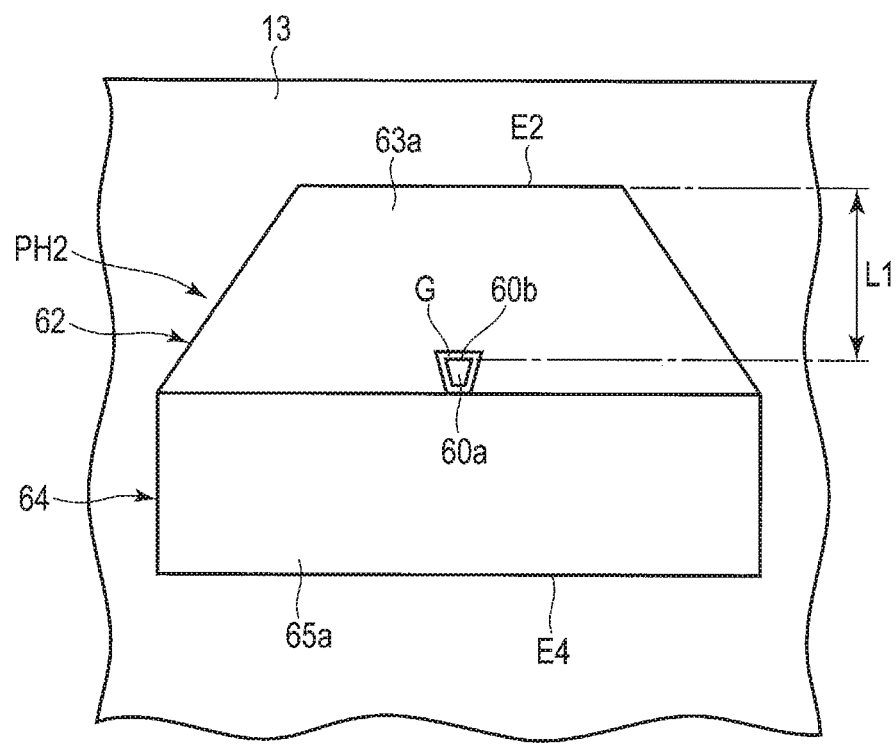
F I G. 15

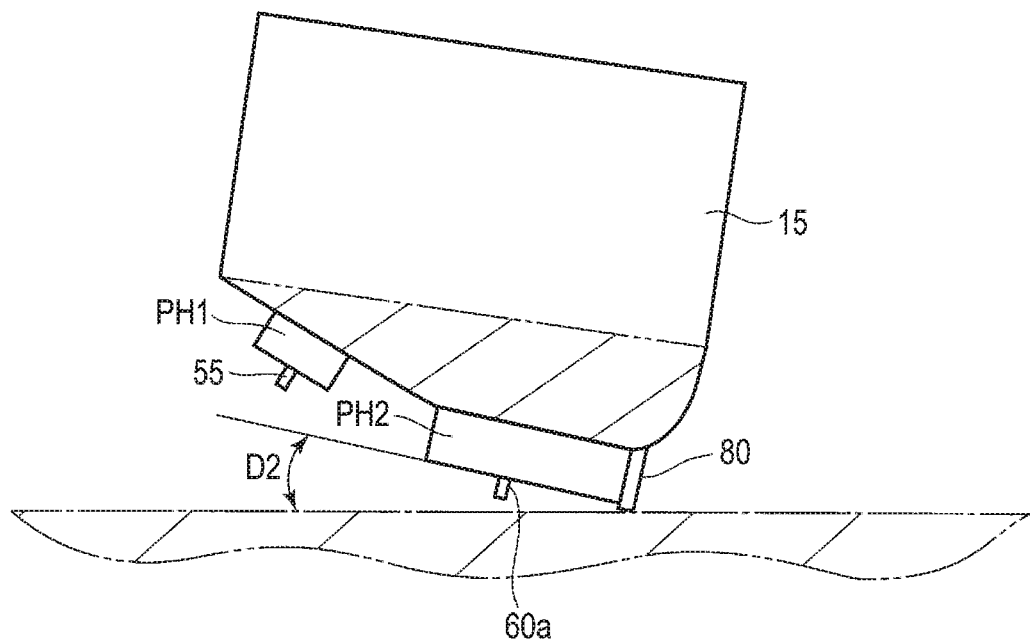
F I G. 22
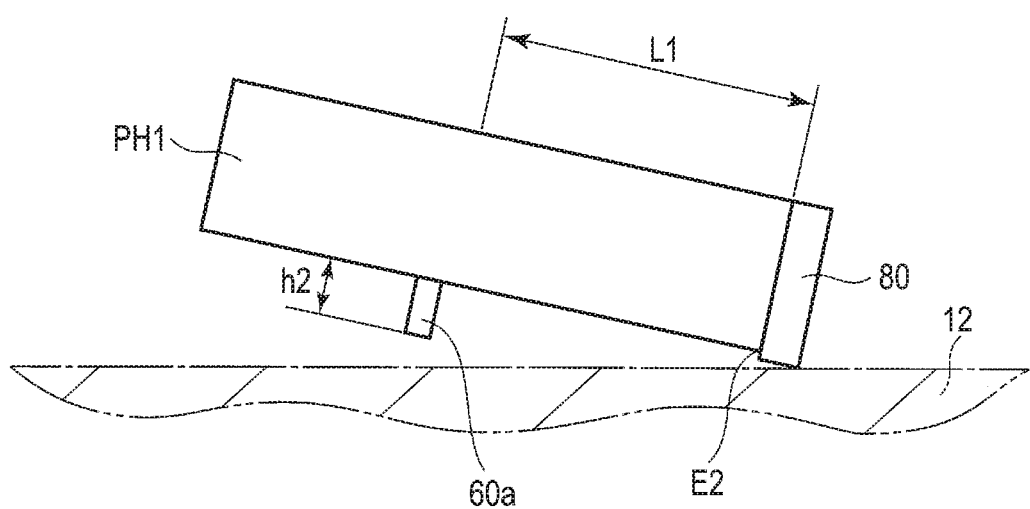
F I G. 23

US 10,867,624 B1

MAGNETIC HEAD AND DISK DEVICE WITH HEAT ACTUATORS

CROSS-REFERENCE TO RELATED APPLICATIONS

This application is based upon and claims the benefit of priority from Japanese Patent Application No. 2019-163226, filed Sep. 6, 2019, the entire contents of which are incorporated herein by reference.

FIELD

Embodiments described herein relate generally to a magnetic head and a disk device comprising the same.

BACKGROUND

As a disk device, for example, a magnetic disk device comprises a rotatable disk-shaped recording medium including a magnetic recording layer, and a magnetic head which carries out recording and reproduction of data with respect to the magnetic recording layer of the recording medium. The magnetic head comprises a slider and a reproducing head and a recording head provided in the slider. In such a magnetic disk device, in order to improve the recording densities, especially, the linear recording density, the gap between the reproducing head and recording head, and the magnetic disk needs to be narrowed.

As an example to the above, such a magnetic disk device has been proposed that comprises a heat actuator embedded in the slider near the reproducing head and the recording head. According to this magnetic disk device, the gap can be reduced by inflating a part of the slider, the reproducing head and the recording head towards the surface side of the recording medium with the heat actuator.

In the above-described magnetic disk device, to set a predetermined gap, the following operation is carried out. That is, the amount of protrusion of the reproducing head and the recording head is increased with the heat actuator, so as to once bring them into contact with the recording medium. Then, with reference to the amount of protrusion at the time of the contact, the heat actuator is controlled so as to achieve a predetermined gap with respect to the recording medium. However, when the magnetic head is brought into contact with a recording medium as described above, the main magnetic pole of the recording head may contact the recording medium and be damaged such as worn-out.

BRIEF DESCRIPTION OF THE DRAWINGS

FIG. 1 is a block diagram schematically showing a hard disk drive (HDD) according to a first embodiment.

FIG. 2 is a side view schematically showing a magnetic head, a suspension and a magnetic disk in the HDD.

FIG. 12 is a side view schematically showing the head portion after adjustment of the amount of protrusion.

FIG. 13 is a diagram showing the relationship between the power supplied to the heat actuator and the output of reproduction signal.

FIG. 14 is a side view schematically showing the head portion at the time of a recording operation.

FIG. 15 is a plan view showing the distal end portion of the recording head of the magnetic head as seen from the ABS side, according to a first modified example.

FIG. 22 is a side view schematically showing the head portion of the magnetic head in a contacting state according to the third embodiment.

FIG. 23 is a side view schematically showing the distal end portion of the recording head of the magnetic head in a contacting state according to the third embodiment.

DETAILED DESCRIPTION

Figure 3:
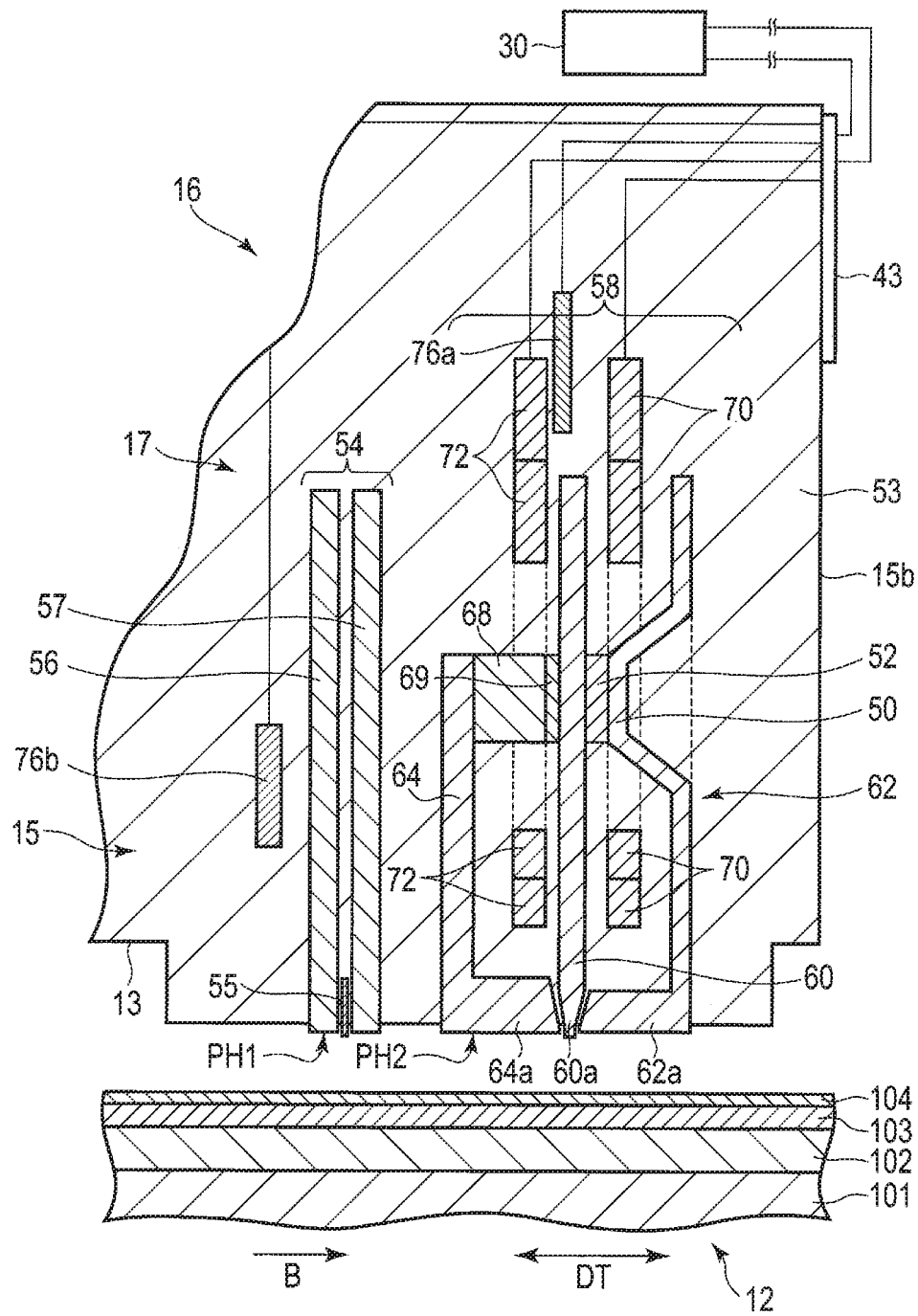
FIG. 3 is an expanded cross sectional view showing a head portion of the magnetic head.

Various embodiments will be described hereinafter with reference to the accompanying drawings. In general, according to one embodiment, a magnetic head comprises a slider comprising an air bearing surface including a trailing end and a leading end, a recording head provided on the slider and comprising a main pole including a distal end portion projecting from the air bearing surface and generating a recording magnetic field and a first shield including a distal end portion projecting from the air bearing surface and opposing a trailing side of the distal end portion of the main pole with a write gap therebetween, a read head provided on the slider and located on a side of the leading end with respect to the recording head, a first heat actuator provided on the slider and controlling a protrusion amount of the recording head and a second heat actuator provided on the slider and controlling a protrusion amount of the read head. The distal end portion of the first shield includes a first shield edge opposing the distal end portion of the main pole with a write gap therebetween, and a distal end surface including a second shield edge located on the trailing end side, so as to be separated from the first shield edge, and the distal end portion of the main pole is provided to project from the distal end surface. When a length between the distal end portion of the main pole and the second shield edge is defined as L1, the projection amount of the distal end portion of the main pole from the distal end surface is defined as h2, a flying pitch of the magnetic head is defined as D1, and a protrusion pitch angle of the recording head is defined as D2 (including zero), the recording head satisfies a relationship of: $L1 \geq h2/(D1+D2)$.

Note that what is disclosed in this specification is merely an example. Appropriate modifications which can be easily conceived by a person ordinarily skilled in the art without departing from the spirit of the embodiments naturally fall within the scope of the present invention. To further clarify explanation, for example, the width, thickness or shape of each structure may be schematically shown in the drawings compared with the actual forms. Note that the drawings are merely examples and do not limit the interpretation of the present invention. In the specification and drawings, elements which are identical to those of the already-mentioned figures are denoted by the same reference numbers. Thus, the detailed explanation of such elements may be omitted.

First Embodiment

As an example of the disk devices, a hard disk drive (HDD) according to a first embodiment will now be described in detail. FIG. 1 is a block diagram schematically showing the HDD according to the first embodiments, and FIG. 2 is a side view showing a magnetic head in a flying state and a magnetic disk.

As shown in FIG. 1, an HDD 10 comprises a rectangular housing 11, a magnetic disk 12 provided as a recording medium in the housing 11, a spindle motor 14 supporting and rotating the magnetic disk 12, a plurality of magnetic heads 16 which record (write) and reproduce (read) data with respect to the magnetic disk 12. The HDD 10 further comprises a head actuator 18 which moves and positions the magnetic heads 16 above arbitrary trucks on the magnetic disk 12. The head actuator 18 includes a carriage assembly 20 which movably supports the magnetic heads 16 and a voice coil motor (VCM) 22 which rotates the carriage assembly 20.

The HDD 10 comprises a head amplifier IC 30 which drives the magnetic heads 16, a main controller 40 and a driver IC 48. The head amplifier IC 30 is provided in, for example, the carriage assembly 20, and is electrically connected to the magnetic heads 16. The head amplifier IC 30 comprises a recording current-supply circuit (recording current-supply portion) 32 which supplies a recording current to recording coils of the magnetic heads 16, a first heater power supply circuit 34a and a second heater power supply circuit 34b, which supply drive power to a heat actuator (heater) of the magnetic head 16, which will be described later, an amplifier (not shown) which amplifies signals read by the magnetic heads, and the like.

The main controller 40 and the driver IC 48 are configured on, for example, a control circuit board (not shown) provided on a rear surface side of the housing 11. The main controller 40 comprises an R/W channel 42, a hard disk controller (HDC) 44, a microprocessor (MPU) 46, a memory 47 and the like. The main controller 40 is electrically connected to the magnetic heads 16 through the head amplifier IC 30. The main controller 40 is electrically connected to the VCM 22 and the spindle motor 14 via the driver IC 48. The HDC 44 is connectable with the host computer 45.

The memory 47 of the main controller 40 stores a heater power setting table 47a, which will be described later, and the like. In the main controller 40, for example, the MPU 46 includes a heater power control portion 46a which controls the power to be supplied to the heat actuator based on the heater power setting table 47a.

As shown in FIGS. 1 and 2, the magnetic disk 12 is configured as a vertical magnetic recording medium. The magnetic disk 12 comprises a nonmagnetic substrate 101 formed into a disk shape having a diameter of, for example, 96 mm (about 3.5 inches). On each surface of the substrate 101, stacked are a soft magnetic layer 102 formed as a foundation layer, from a material which exhibits soft magnetic properties, a vertical magnetic recording layer 103 which has magnetic anisotropy perpendicular to the surface of the magnetic disk 12 thereon the in the upper levels, and a protective film 104 on top in order. The magnetic disk 12 is fit with a hub of the spindle motor 14 so as to be coaxial with each other. The magnetic disk 12 is rotated in a direction indicated by arrow B at a predetermined speed by the spindle motor 14.

The carriage assembly 20 includes a bearing portion 24 rotatably supported by the housing 11 and a plurality of suspensions 26 extending out from the bearing portion 24. As shown in FIG. 2, each magnetic head 16 is supported by an extending end of each respective suspension 26. The magnetic head 16 is electrically connected to the head amplifier IC 30 via a wiring member (flexure) 28 provided in the carriage assembly 20.

As shown in FIG. 2, the magnetic head 16 is constituted as a flying type head, and includes a slider 15 substantially formed into a rectangular parallelepiped shape and a head portion 17 formed in an end portion on an outflow (trailing) side of the slider 15. The slider 15 is formed of a sintered body of, for example, alumina and titanium carbide (AlTiC), and the head portion 17 comprises a plurality of thin films. The slider 15 is attached to a gimbal portion 28a of the wiring member 28.

The slider 15 comprises a substantially rectangular (disk counter) surface (air bearing surface (ABS)) 13 counter opposing the magnetic disk 12. The slider 15 is maintained in a state where it flies from the surface of the magnetic disk 12 by air flow C produced between the disk surface and the ABS 13 by the rotation of the magnetic disk 12. The direction of the air flow C coincides with the direction B of the rotation of the magnetic disk 12. The slider 15 includes a leading end 15a located in the inflow side of the air flow C and a trailing end 15b located in the outflow side of the air flow C. As the magnetic disk 12 rotates, the magnetic head 16 travels in a direction indicated by arrow A (a head traveling direction) with respect to the magnetic disk 12, i.e., a direction opposite to the rotating direction B of the disk.

In the state where the magnetic head 16 is flying, the ABS 13 of the slider 15 is inclined to the surface of the magnetic disk 12 only by a first pitch angle (a flying pitch (tilt angle)) D1.

Figure 4:
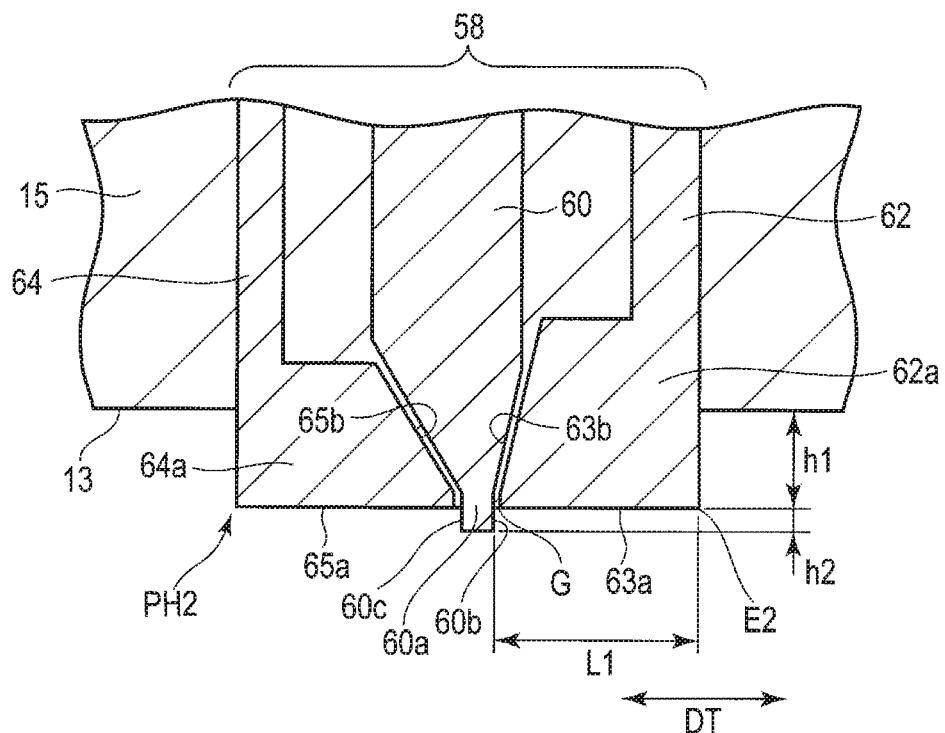
FIG. 4 is an expanded cross sectional view showing a distal end portion of the recording head.

FIG. 3 is an enlarged cross sectional view of the head portion 17 of the magnetic head 16 and the magnetic disk 12, and FIG. 4 is an enlarged cross sectional view of a distal end portion of the recording head.

As shown in FIG. 3, the head portion 17 is formed as a magnetic head of a separation type and includes a reproducing head (read head) 54 and a recording head (write head) 58, formed by thin film process, in the trailing end 15b of the slider 15. The reproducing head 54 and the recording head 58 are covered by a nonmagnetic protective insulation film 53 except for the portion exposed to the ABS 13 of the slider 15. The protective insulation film 53 is configured as an outline of the head portion 17. Further, the head portion 17 includes a first heat actuator which controls the amount of protrusion of the recording head 58 and a second heat actuator which controls the amount of protrusion of the reproducing head 54. The first heat actuator includes, for example, a heater 76a. The heater 76a is embedded in the protective insulation film 53 to be located near the recording head 58. The second actuator includes, for example, a heater 76b. The heater 76b is embedded in the protective insulation film 53 to be located near the reproducing head 54.

The longitudinal direction of the recording track to be formed on the magnetic recording layer 103 of the magnetic disk 12 is defined as a down-track direction DT, and the width direction of the recording track normally crossing the longitudinal direction is defined as a cross track direction WT.

The reproducing head 54 includes a magneto-resistive element 55, and a first magnetic shield film 56 and a second magnetic shield film 57 arranged respectively on a leading (inflow) side and a trailing (outflow) side of the magneto-resistive element 55 in the down track direction DT so as to interpose the magneto-resistive element 55 therebetween. The magneto-resistive element 55, the first and second magnetic shield films 56 and 57 extend substantially perpendicular to the ABS 13. Lower end portions (distal end portions) of the magneto-resistive element 55 and the first and second magnetic shield films 56 and 57 slightly protrude from the ABS 13, so as to form a first protrusion PH1. In the first protrusion PH1, the amount of protrusion of the distal end portion of the magneto-resistive element 55 is greater than the amount of protrusion of the distal end portions of the first and second magnetic shield films 56 and 57, and the distal end portion of the magneto-resistive element 55 protrudes over the first and second magnetic shield films.

The recording head 58 is provided on a trailing end 15b side of the slider 15 with respect to the reproducing head 54. The recording head 58 comprises a main pole 60 which produces a recording magnetic field perpendicular to the surface of the magnetic disk 12, a trailing shield (first shield) 62 provided in a trailing side of the main pole 60, so as to oppose the main pole 60 with a write gap G therebetween, a leading shield (second shield) 64 opposing a leading side of the main pole 60, and a pair of side shields 61 (see FIG. 6) formed to be integrated with the trailing shield 62 and located respectively on both sides of the main pole 60 in the cross track direction WT. The main pole 60 and the trailing shield 62 constitute a first magnetic core which forms a magnetic path, and the main pole 60 and the leading shield 64 constitute a second magnetic core which forms a magnetic path. The recording head 58 comprises a first recording coil 70 wound around the first magnetic core, and a second recording coil 72 wound around the second magnetic core.

As shown in FIGS. 3 and 4, the main pole 60 is formed of a soft magnetic material having high permeability and high saturation magnetic flux density, and extends substantially perpendicular to the ABS 13. A distal end portion 60a on an ABS 13 side of the main pole 60 is tapered down towards the ABS 13, and is formed into a pillar shape with a narrower width as compared to the other parts. The distal end portion 60a of the main pole 60 slightly projects from the ABS 13 of the slider 15.

The trailing shield 62 is formed of a soft magnetic material, and is provided to close the magnetic paths efficiently via the soft magnetic layer 102 of the magnetic disk 12 located directly under the main pole 60. The trailing shield 62 is formed into substantially an L shape, and includes a distal end portion 62a formed into a long and slender rectangular shape. The distal end portion 62a slightly projects from the ABS 13 of the slider 15. The distal end portion 62a includes a rectangular distal-end surface (lower end surface) 63a extending substantially parallel to the ABS 13, and a leading-side end surface (magnetic pole end surface) 63b opposing the distal end portion 60a of the main pole 60 with a write gap G therebetween. The leading-side end surface 62b extends to be perpendicular or slightly inclined with respect to the ABS 13.

The trailing shield 62 includes a first connection portion 50 connected to the main pole 60. The first connection portion 50 is magnetically connected to an upper part of the main pole 60, i.e., a part of the main pole 60, which is apart from the ABS 13, via a non-conductive material 52. The first recording coil 70 is wound around, for example, the first connection portion 50 in the first magnetic core. When writing a signal on the magnetic disk 12, a recording current is allowed to flow in the first recording coil 70, and thus the first recording coil 70 excites the main pole 60 to allow a magnetic flux to flow in the main pole 60.

The leading shield 64 formed of the soft magnetic material is provided in the leading side of the main pole 60 so as to oppose the main pole 60. The leading shield 64 is formed into substantially an L shape, and a distal end portion 64a on the ABS 13 side is formed into a long and slender rectangular shape. The distal end portion 64a slightly projects from the ABS 13 of the slider 15. The distal end portion 64a includes a rectangular distal end surface (lower end surface) 65a extending substantially parallel to the ABS 13 and a trailing-side end surface (magnetic pole end surface) 65b opposing the distal end portion 60a of the main pole 60 with a gap therebetween.

Further, the leading shield 64 includes a second connection portion 68 joined to the main pole 60 at a location apart from the ABS 13. The second connection portion 68 is formed from, for example, a soft magnetic material, and is magnetically connected to the upper part of the main pole 60, i.e., a part of the main pole 60, which is separated from the ABS 13, via the non-conductive material 59. Thus, the second connection portion 68 forms a magnetic circuit together with the main pole 60 and the leading shield 64. The second recording coil 72 of the recording head 58 is wound around, for example, the second connection portion 68, and applies a magnetic field to the magnetic circuit.

As described above, the distal end portion 60a of the main pole 60, the distal end portion 62a of the trailing shield 62, and the distal end portion 64a of the leading shield 64 slightly project from the ABS 13, so as to constitute a second protrusion PH2.

Figure 5:
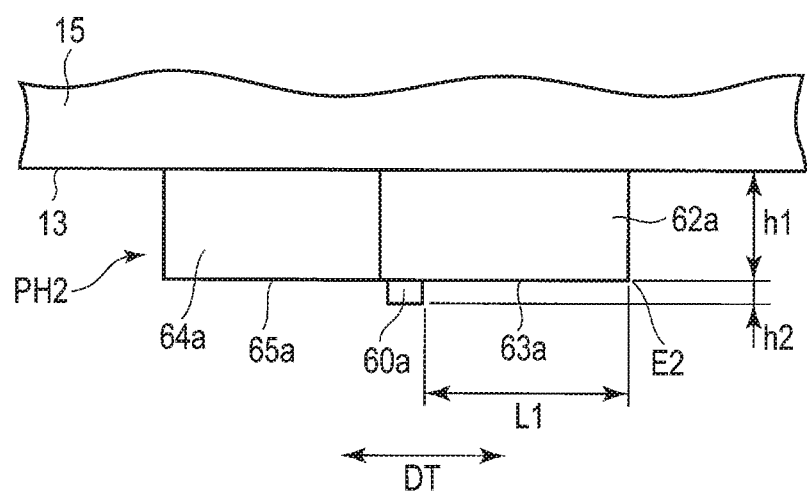
FIG. 5 is a side view showing the distal end portion of the recording head.
Figure 6:
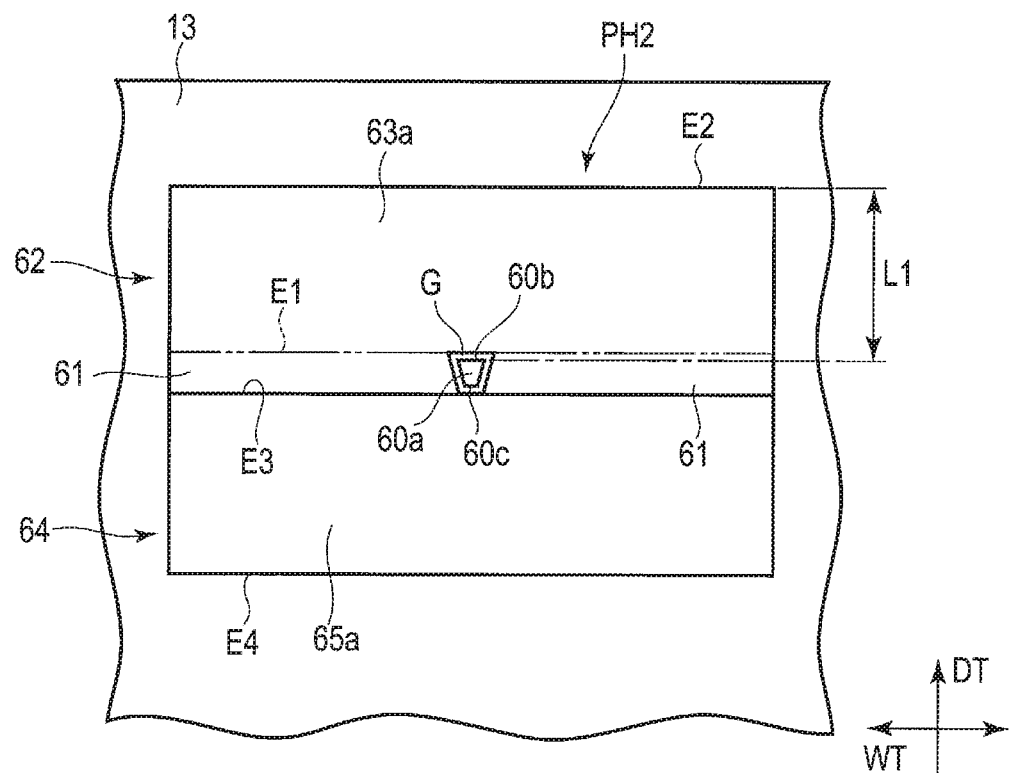
FIG. 6 is a plan view of the recording head as seen from an ABS side.

FIG. 5 is a side view showing the distal end portion of the recording head, and FIG. 6 is a plan views showing the distal end portion of the recording head as seen from the ABS side.

As shown in FIGS. 4 to 6, in the second protrusion PH2 of the recording head 58, which projects from the ABS 13, the distal end surface 63a of the trailing shield 62 and the distal end surface 65a of the leading shield 64 are located at substantially the same height, and are arranged on the same plane. A projection height (the amount of protrusion) h1 of the distal end portion 62a of the trailing shield 62 and the distal end portion 64a of the leading shield from the ABS 13 is about 4 nm.

The main pole 60 distal end portion 60a projects out over the distal end surface 63a of the trailing shield 62 and the distal end surface 65a of the leading shield 64. A projection height (the amount of protrusion) h2 from the distal end surfaces 63a and 65a is set to, for example, about 0.3 to 1 nm.

As shown in FIG. 6, the distal end portion 60a of the main pole 60 is formed to have, for example, a trapezoidal cross section. The distal end portion 60a includes a trailing-side end surface 60b opposing the distal end portion 62a of the trailing shield 62 with the write gap G therebetween, a leading-side end surface 60c located substantially parallel to the trailing-side end surface 60b and opposing the distal end portion 64a of the leading shield 64 with a gap therebetween, and a pair of side surfaces respectively intersecting the trailing-side end surface 60b and the leading-side end surface 60c and opposing the side shields 61 with a gap therebetween.

The distal end surface 63a of the trailing shield 62 is formed into substantially a rectangular shape, and includes a leading-side edge (first shield edge) E1 and a trailing-side edge (second shield edge) E2 each extending in the track width direction DT and opposing substantially parallel to each other. The leading-side edge E1 opposes the trailing-side end surface 60b of the distal end portion 60a of the main pole 60 with the write gap G therebetween. The trailing-side edge E2 is located away from the leading-side edge E1 towards the trailing end side. Note that the pair of side shields 61 are formed continuous to the leading-side edge E1, and they oppose the pair of side surfaces of the distal end portion 60a with a gap therebetween.

The distal end surface 65a of the leading shield 64 is formed into substantially a rectangular shape, and includes a trailing-side edge E3 and a leading-side edges E4 each extending in the track width direction DT and opposing substantially parallel to each other. The trailing-side edge E3 opposes to the leading-side end surface 60c of the distal end portion 60a of the main pole 60 with a gap therebetween. Further, the trailing-side edge E3 adjacently opposes the pair of side shields 61. The leading-side edge E4 is located away from the trailing-side edge E3 towards the leading end side.

As shown in FIGS. 4, 5 and 6, in the second protrusion PH2 of the recording head 58 configured as described above, if the length between the trailing-side edge E2 and the distal end portion 60a of the main pole 60, or in the embodiment, the length between the trailing-side edge E2 and the trailing-side end surface 60b of the distal end portion 60a, is set to L1, the protrusion height h2 of the distal end portion 60a of the main pole 60 and the length L1 are set to satisfy the following expression (1).

$$L1 \geq h2/(\text{the first pitch angle } D1 + \text{the second pitch angle } D2) \quad (1)$$

As will be described later, the second pitch angle D2 indicates a pitch angle of the second protrusion PH2 when the trailing-side edge E2 of the second protrusion PH2 contacts the surface of the magnetic disk 12. The second pitch angle D2 includes the case of zero, that is, D1=D2.

For example, when the amount of protrusion h2 is 0.5 nm, the first pitch angle D1 is 150 μrad and the second pitch angle D2 is 50 μrad, the length L1 is set to 2.5 μm or greater.

As shown in FIG. 3, a plurality of connection terminals 43 are provided on the trailing end 15b of the slider 15. The first recording coil 70 and the second recording coil 72 are each connected to the connection terminal 43 through wiring lines and are further connected to the head amplifier IC 30 via the flexure 28. When writing a signal on the magnetic disk 12, a recording current is allowed to flow from the recording current-supply circuit 32 of head amplifier IC 30 to the first recording coil 70 and the second recording coil 72, and thus the main pole 60 is excited to allow a magnetic flux to flow to the main pole 60. The recording current supplied to the first recording coil 70 and the second recording coil 72 is controlled by the main controller 40.

Similarly, the magneto-resistive element 55 of the reproducing head 54 is connected to the connection terminal 43 via a wiring line (not shown), and is further connected to the head amplifier IC 30 via the flexure 28. A signal read by the reproducing head 54 is amplified by the head amplifier IC 30, and sent to the main controller 40.

The first heater 76a and the second heater 76b are each connected to the connection terminals 43 via wiring lines, and the further connected to the head amplifier IC 30 via the flexure 28.

Drive power is applied the first heater 76a and the second heater 76b from the first heater power supply circuit 34a and the second heater power supply circuit 34b of head amplifier IC30, and thus the heaters and the surroundings of the heaters are heated. In this manner, the recording head 58 or the reproducing head 54 swelled out towards the magnetic-disk 12 side. The drive power supplied to the first heater 76a and the second heater 76b is controlled by a heater power controller 46a of the main controller 40.

Next, the adjustment operation for adjusting the gap (the amount of the gap) between the recording head 58 and the reproducing head 54 of the magnetic head 16 and the surface of the magnetic disk 12 by means of the first heat actuator and the second heat actuator will now be described.

Figure 7:
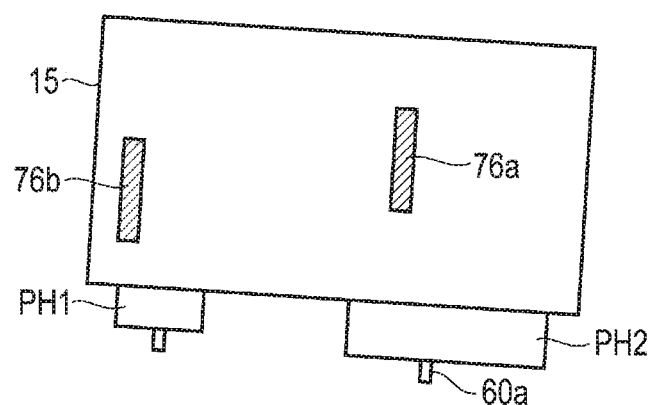
FIG. 7 is a side view schematically showing the head portion.
Figure 8:
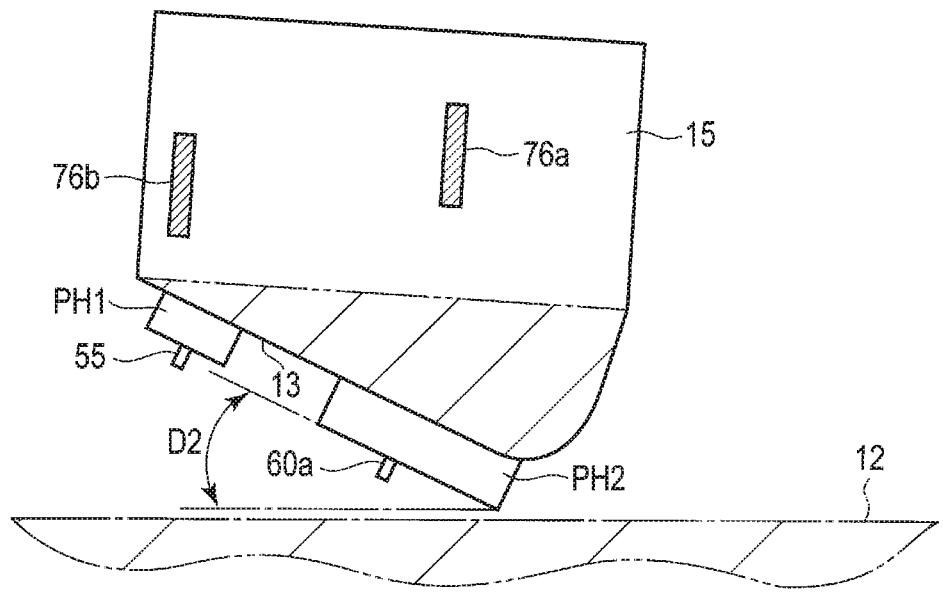
FIG. 8 is a side view schematically showing the head portion in the state where a recording head portion is protruded by a heat actuator.

FIG. 7 is a side view schematically showing the head portion of the magnetic head in the state where no adjustment is conducted. FIG. 8 is a side view schematically showing the head portion in the state where the recording head portion is swelled out towards the magnetic-disk 12 side by the first heater 76a, and FIG. 9 is a side view schematically showing the head portion in the state where the reproducing head portion is swelled out towards the magnetic-disk 12 side by the second heater 76b.

As shown in FIG. 7, while no adjustment is conducted, that is, when the power is not applied to the first heater 76a and the second heater 76b, the ABS 13 of the slider 15 is substantially flat and inclined only by the first pitch angle (flying pitch angle) D1.

As shown in FIG. 8, when the power is applied to the first heater 76a and the second heater 76b while the first power supplied to the first heater 76a and the second power supplied to the second heater 76b are maintained at a predetermined power ratio (the first power>the second power), the first heater 76a generates heat and the recording head 58 and the protective insulation film 53 around the recording head are heated. Similarly, the second heater 76b generates heat and the reproducing head 54 and the protective insulation film 53 around the reproducing head are heated. Thus, the recording head 58 and the protective insulation film 53 thermally expand to be greater in size than the reproducing head 54, to swell out towards the surface of the magnetic disk 12. The second pitch angle (protrusion pitch angle) D2 of the second protrusion PH2 is positive. Here, as to the pitch angle, the direction in which the trailing-side edge E2 of the second protrusion PH2 is inclined to the magnetic-disk 12 side with respect to the distal end portion 60a of the main pole is defined as positive, whereas the direction in which the trailing-side edge E2 is inclined to separate from the magnetic disk 12 with respect to the distal end portion 60a of the main pole is defined as negative.

Figure 9:
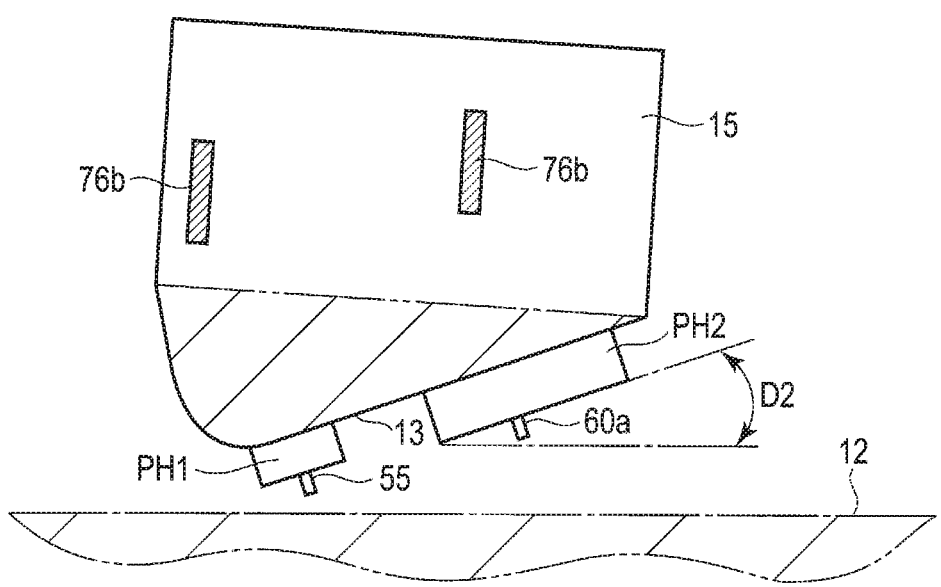
FIG. 9 is a side view schematically showing the head portion in the state where a reproducing head portion is protruded by the heat actuator.

As shown in FIG. 9, when the power is applied to the first heater 76a and the second heater 76b at a predetermined power ratio (the first power<the second power), the reproducing head 54 swells out toward the surface of the magnetic disk 12 so as to be greater in amount than that of the recording head 58. In this case, the second pitch angle D2 of the second protrusion PH2 is negative.

Figure 10:
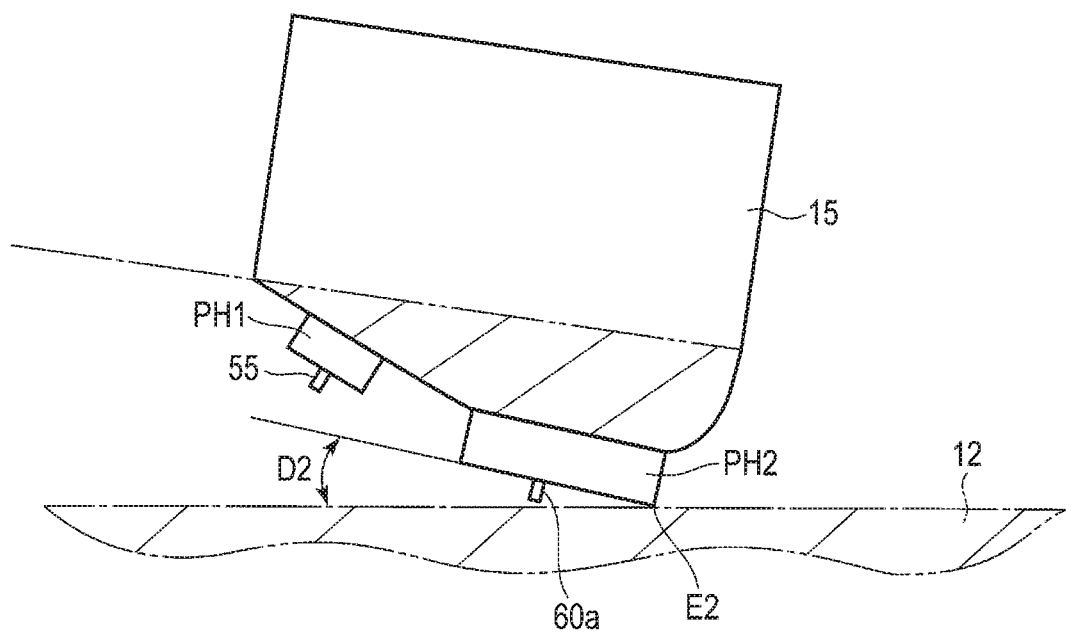
FIG. 10 is a side view schematically showing the head portion in a contacting state.
Figure 11:
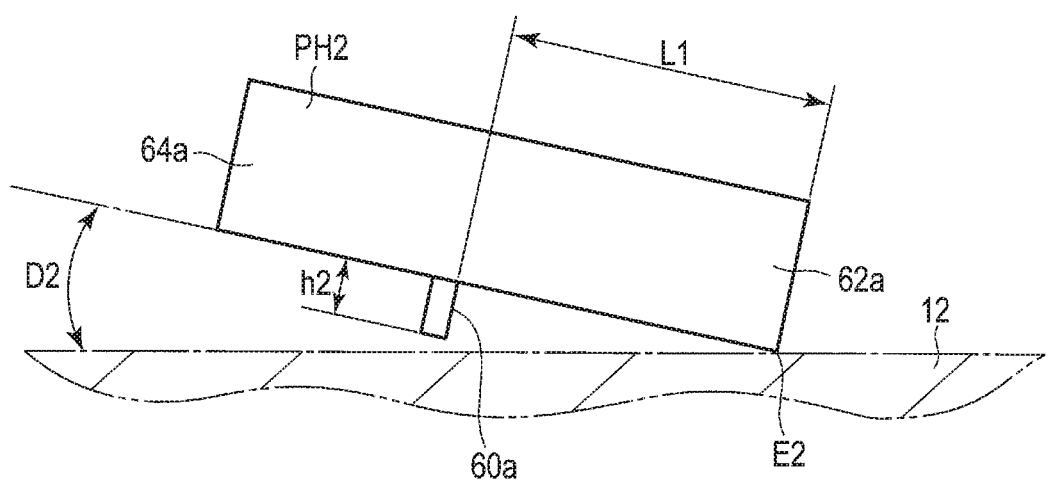
FIG. 11 is an expanded side view showing the distal end portion of the recording head in the contacting state.

FIG. 10 is a side view schematically showing the head portion in the state where the recording head portion is swelled out towards the magnetic-disk 12 side until the second protrusion PH2 is brought into contact with the magnetic-disk surface, and FIG. 11 is an expanded side view schematically showing the second protrusion PH2.

In the adjustment of the amount of gap, the main controller 40 increase the first power and the second power while maintaining with the ratio (the first power>the second power) between the first power (first control amount) supplied to the first heater 76a and the second power (second control amount) supplied to the second heater 76b, so as to increase the protrusion amount of the first protrusion PH1 and the second protrusion PH2, thus making the second protrusion PH2 brought into contact with the surface of the magnetic disk 12. Here, as shown in FIGS. 10 and 11, the trailing-side edge E2 of the second protrusion PH2, that is, the trailing-side edge E2 of the distal end portion 62a of the trailing shield 62 contacts the surface of the magnetic disk 12, and the second protrusion PH2 is inclined by the second pitch angle D2 to the surface of the magnetic disk 12.

As described above, the protrusion amount h2 of the main pole distal end portion 60a in the second protrusion PH2 and the length L1 between the main pole distal end portion 60a and the trailing-side edge E2 are set to satisfy the expression (1) provided above. Therefore, as shown in FIG. 11, in the state where the trailing-side edge E2 of the second protrusion PH2 contacts the surface of the magnetic disk 12, the distal end portion 60a of the main pole 60 is separated from the magnetic-disk surface without being brought into contact with the magnetic disk 12. That is, even when the second protrusion PH2 contacts the magnetic disk 12, the contacting of the distal end portion 60a of the main pole 60 to the magnetic disk 12 is prevented, thus wear and damage by contact can be prevented.

FIG. 12 is a side view schematically showing the head portion after the adjustment of the amount of gap. FIG. 13 is a characteristic diagram showing the relationship between the power supplied to the heat actuator (heater) and the output of the reproduction signal of the reproducing head 54. FIG. 14 is a side view schematically showing the head portion of the magnetic head 16 while recording.

The memory 47 of the main controller 40 stores the heater power setting table 47a expresses the relationship between the supplied power and the output of the reproduction signal illustrated in FIG. 13.

The main controller 40 sets a desired amount of gap by adjusting the first power and the second power on the basis of the first power value and the second power value when the trailing-side edge E2 is brought into contact with the magnetic disk 12. Note that the main controller 40 monitors the output of the reproduction signal of the reproducing head 54 during the process of bringing the second protrusion PH2 into contact with the magnetic disk 12, to be able to determine the time at which the output of the reproduction signal becomes maximum is the time when the second protrusion PH2 is brought into contact with the magnetic disk 12. The main controller 40 selects the first power value and the second power value corresponding to the maximum value of the output of the reproduction signal based on the heater power setting table 47a, to set them as the first power and the second power at the time where being brought into contact.

The main controller 40 selects a desired output of reproduction signal from the heater power setting table 47a, and reads the supplied power value corresponding to the selected output of reproduction signal. The main controller 40 reduces the first power and the second power from their the power values at the time of the contact, to the read value of the power supplied while maintaining the ratio between the first power and the second power, thereby reducing the amount of protrusion of the first protrusion PH1 and the second protrusion PH2. Thus, as shown in FIG. 12, a predetermined gap F1 between the magneto-resistive element 55 of the first protrusion PH1 and the surface of the magnetic disk is set, that is, the gap F1 at which the selected output of the reproduction signal is obtained, is set. At the same time, a gap F2 between the main pole distal end portion 60a of the second protrusion PH2 and the surface of the magnetic disk is set. The value of the supplied power is stored in the memory 47 as a setting power value for setting the gap.

As described above, the operation of adjusting the amount of gap by the main controller 40 is performed, for example, at the shipment of the HDD and the first power value and the second power value thus set are stored in the memory 47. At the time of operation of the HDD, the main controller 40 applies the first power value and the second power value set based on the memory 47 to the first heater 76a and the second heater 76b, and sets the amounts of gap of the magnetic head 16 to F1 and F2.

FIG. 14 is a side view schematically showing the head portion of the magnetic head 16 during the recording operation.

In order to improve the recording density, the gap between the recording head 58 and the surface of the magnetic disk should desirably be as small as possible. Here, as shown in FIG. 14, the main controller 40 increases the first power value by a predetermined amount while maintaining the second power value at the time of recording by the magnetic head 16, and changes the ratio between the first power and the second power. The amount of swelling out of the second protrusion PH2 of the recording head 58 increases, and the distal end portion 60a of the main pole 60 further approaches the surface of the magnetic disk. The gap between the distal end portion 60a of the main pole 60 and the surface of the magnetic disk decreases from F2 to F3. Thus, the recording density, especially, the linear recording density can be improved. Note that the power ratio at the time of recording and the first power value should desirably be stored in the memory 47 or the like.

According to the HDD and the magnetic head according to the first embodiment, configured as described above, the gap between the magnetic head 16 and the magnetic disk 12 can be set sufficiently small, thereby making it possible to improve the recording density. Moreover, when adjusting the gap, the contact between the distal end portion 60a of the main pole 60 and the magnetic disk 12 can be prevented, thus preventing wear and damage of the main pole 60. It is possible to improve the life and reliability of the magnetic head.

Next, magnetic heads of HDDs according to modified examples will be described. Note in other examples described below, the same elements as those of the first embodiment described above will be denoted by the same referential symbols as in the first embodiment and the detailed explanations therefor may be omitted or simplified.

First Modified Example

FIG. 15 is a plan view showing a distal end portion of the recording head of a magnetic head according to the first modified example as seen from the ABS side. As shown, the distal end surface 63a of the trailing shield (first shield) 62 is not limited to a rectangular shape but may be a trapezoidal. In this case as well, the trailing-side edge E2 of the distal end surface 63a is spaced apart by the length L1 from the distal end portion 60a of the main pole 60.

Second Modified Example

Figure 16:
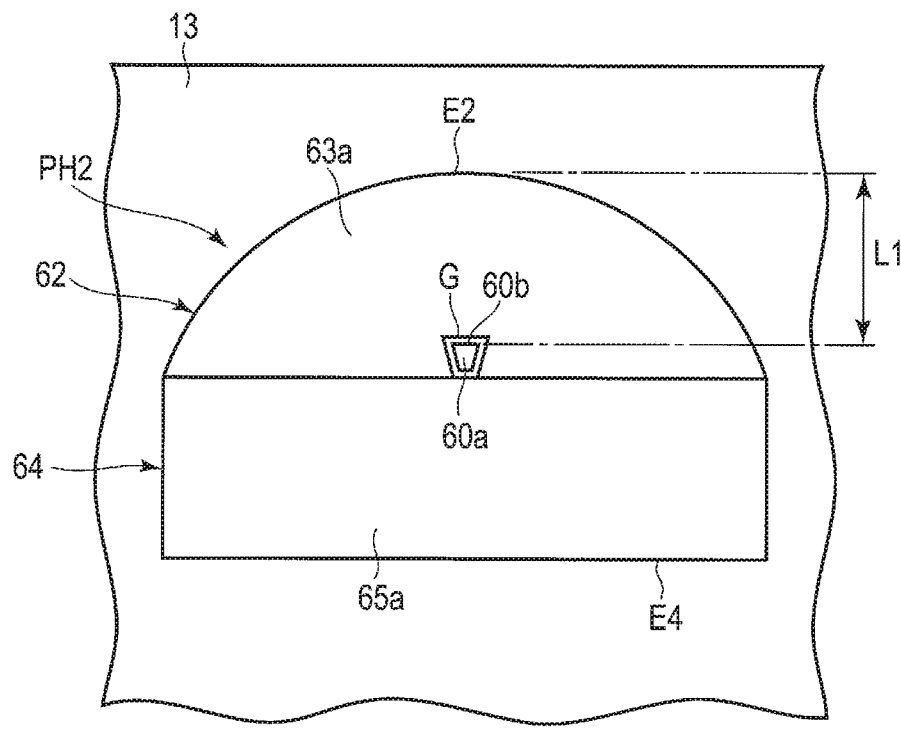
FIG. 16 is a plan view showing the distal end portion of the recording head of the magnetic head as seen from the ABS side, according to a second modified example.

FIG. 16 is a plan view showing a distal end portion of the recording head of the magnetic head according to the second modified example as seen from the ABS side. As shown, the distal end surface 63a of the trailing shield (first shield) 62a may be substantially semi-circular. In this case as well, the trailing-side edge E2 of the distal end surface 63a has an arc shape, and is formed to have a gap of the length L1 between the top portion of the arc and the distal end portion 60a of the main pole 60.

Next, magnetic heads of HDDs according to other embodiments will be described. Note in other embodiments described below, the same elements as those of the first embodiment described above will be denoted by the same referential symbols as in the first embodiment and the detailed explanations therefor may be omitted or simplified.

Second Embodiment

Figure 17:
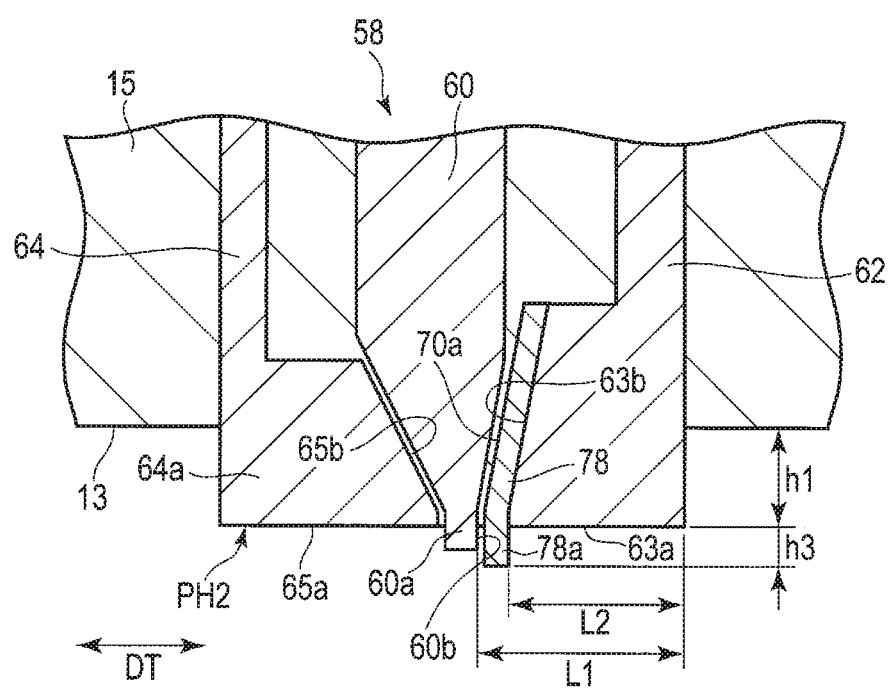
FIG. 17 is a cross section of a distal end portion of a recording head of a magnetic head according to a second embodiment.
Figure 18:
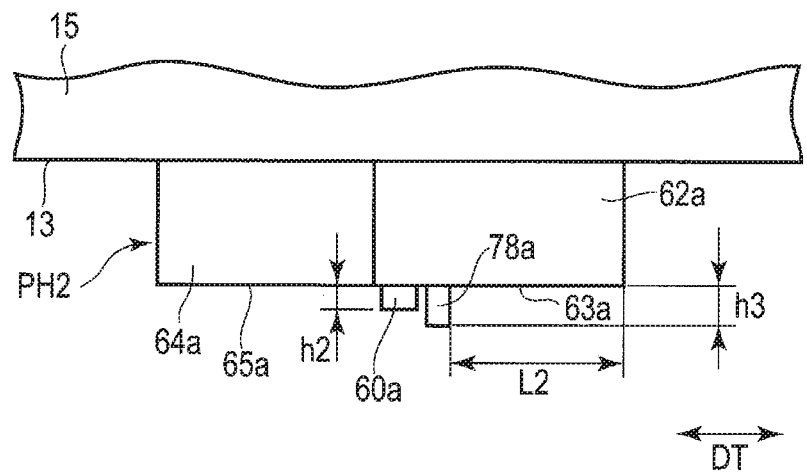
FIG. 18 is a side view showing the distal end portion of the recording head of the magnetic head according to the second embodiment.
Figure 19:
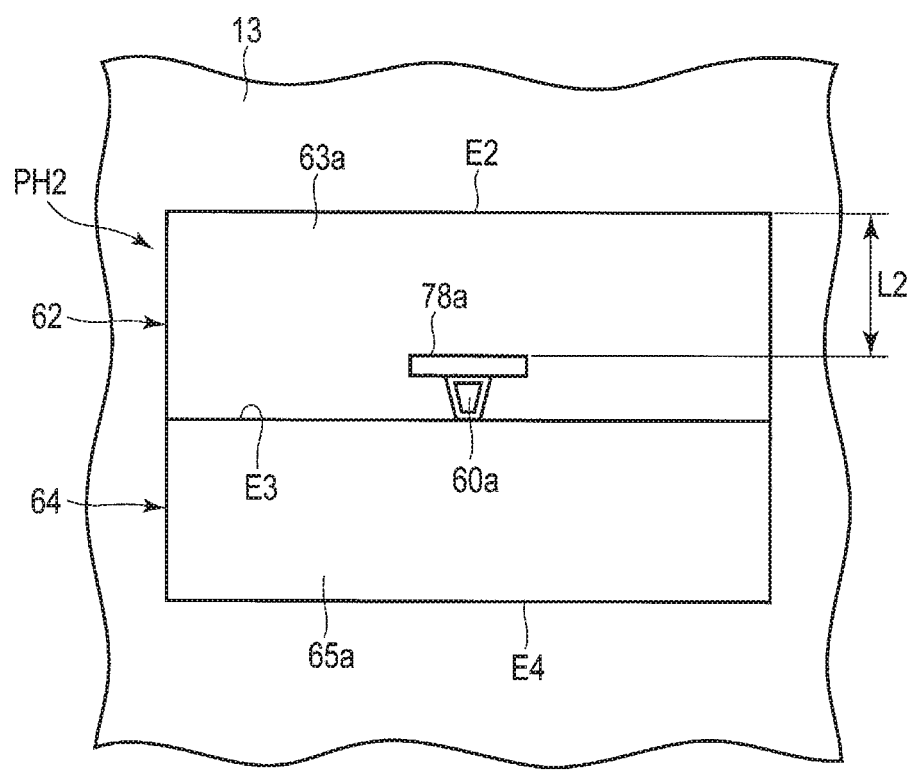
FIG. 19 is a plan view showing the distal end portion of the recording head of the magnetic head as seen from the ABS side, according to the second embodiment.

FIG. 17 is a cross section of a distal end portion of a recording head of a magnetic head according to a second embodiment. FIG. 18 is a side view of the distal end portion of the recording head of the magnetic head according to the second embodiment. FIG. 19 is a plan view of the distal end portion of the recording head of the magnetic head according to the second embodiment as seen from the ABS side.

As shown, according to the second embodiment, the recording head 58 of the magnetic head 16 further comprises a third shield 78 provided between the trailing shield (first shield) and the main pole 60. The third shield 78 is formed of a material different from that of the trailing shield 62, that is, for example, a magnetic material having a high magnetic permeability.

The third shield 78 is overlaid on the leading-side end surface 63b of the trailing shield 62 and opposed to the trailing-side end surface 60b of the distal end portion 60a of the main pole 60 with a write gap G therebetween. Moreover, the third shield 78 includes a distal end portion 78a projecting out over the distal end surface 63a of the trailing shield 62. A projection height (protrusion amount) h3 from the distal end surfaces 63a and 65a of the distal end portion 78a is set to, for example, about 0.3 to 1 nm, and is set to be greater than the amount h2 of the distal end portion 60a of the main pole.

In the second protrusion PH2 of the recording head 58 configured as described above, when the length between the distal end portion 78a of the third shield 78 and the trailing-side edge E2 of the distal end surface 63a is set to L2, the protrusion amount h3 of the third shield 78 and the length L2 are set to satisfy the following expression (2).

$$L2 \geq h3/(\text{the first pitch angle } D1 + \text{the second pitch angle } D2) \quad (2)$$

The first pitch angle D1 is a flying pitch angle of the magnetic head 16, and the second pitch angle D2 indicates the pitch angle of the second protrusion PH2 when the trailing-side edge E2 of the second protrusion PH2 contacts the surface of the magnetic disk 12. The second pitch angle D2 includes the case of zero, i.e., the case where D1=D2. For example, when the protrusion amount h3 is 0.5 nm, the first pitch angle D1 is 150 μrad and the second pitch angle D2 is 50 μrad, the length L2 is set to 2.5 μm or greater.

In the second embodiment, the other structural elements of the magnetic head 16 and the HDD are the same as those of the magnetic head and the HDD in the first embodiment described above.

According to the second embodiment configured as described above, even if the trailing-side edge E2 contacts the magnetic disk during adjustment of the gap, the contact between the distal end portion 78a of the third shield 78 and the distal end portion 60a of the main pole 60 and the magnetic disk 12 can be avoided, thereby making it possible to prevent wear and damage of the third shield 78 and the main pole 60. Thus, it is possible to improve the life and reliability of the magnetic head.

Third Embodiment

Figure 20:
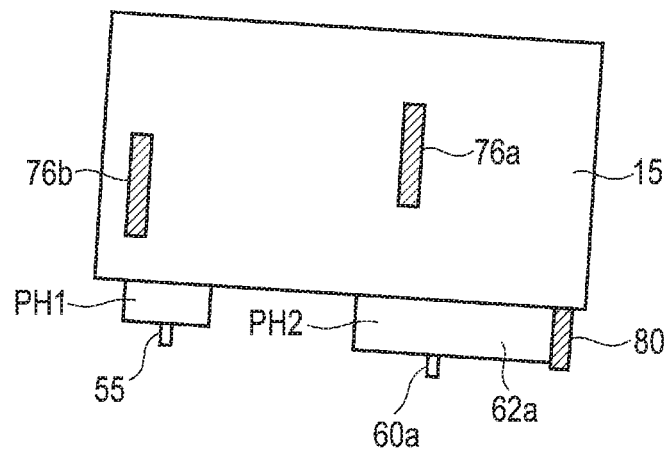
FIG. 20 is a side view schematically showing a head portion of a magnetic head according to a third embodiment.
Figure 21:
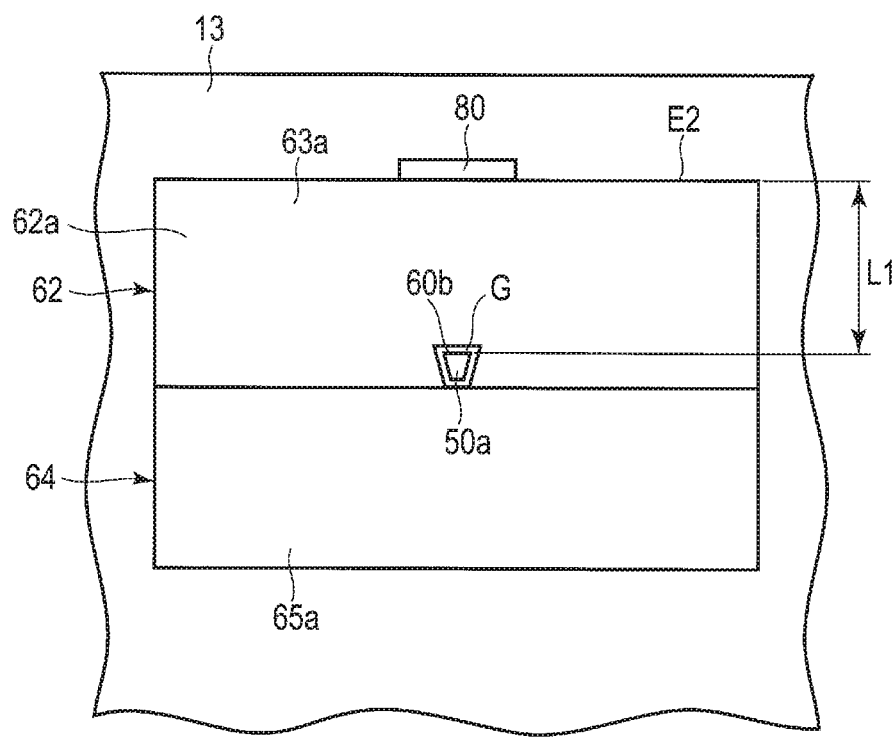
FIG. 21 is a plan view showing a distal end portion of a recording head of the magnetic head as seen from the ABS side, according to the third embodiment.

FIG. 20 is a side view schematically showing a head portion of a magnetic head according to a third embodiment, and FIG. 21 is a plan view of the distal end portion of the recording head of the magnetic head according to the third embodiment as seen from the ABS side.

As shown, according to third embodiment, the recording head 58 of the magnetic head 16 further comprises a contact sensor, for example, a resistance detection type heat contact sensor 80, provided in the second protrusion PH2. The heat contact sensor 80 is a resistor formed into substantially a rectangular shape, and is mounted on the trailing-side end surface of the distal end portion 62a of the trailing shield 62 in the second protrusion PH2. The heat contact sensor 80 is located so as to oppose substantially the central portion of the trailing-side edge E2 in the longitudinal direction. Further, an end portion of the heat contact sensor 80 slightly projects from the trailing-side edge E2. The heat contact sensor 80 is electrically connected to the head IC and the main controller, described above, via a wiring line and flexure (not shown). The heat contact sensor 80 is supplied with electricity from the main controller, and it sends a detection signal to the main controller.

Figure 24:
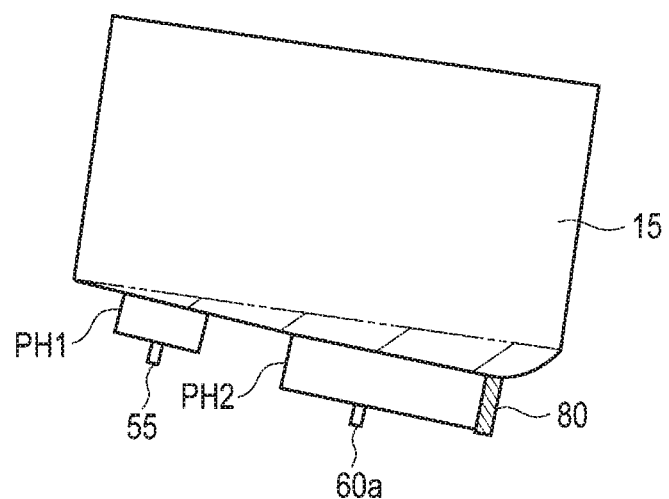
FIG. 24 is a side view schematically showing the head portion of the magnetic head after adjustment of the amount of protrusion according to the third embodiment.
Figure 25:
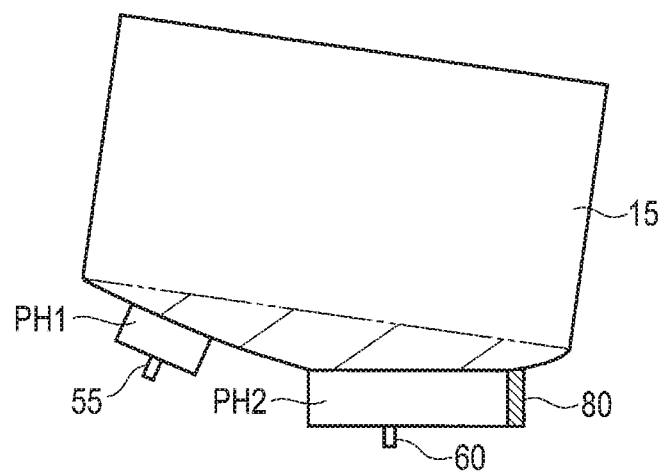
FIG. 25 is a side view schematically showing the head portion of the magnetic head at the time of a recording operation according to the third embodiment.
Figure 26:
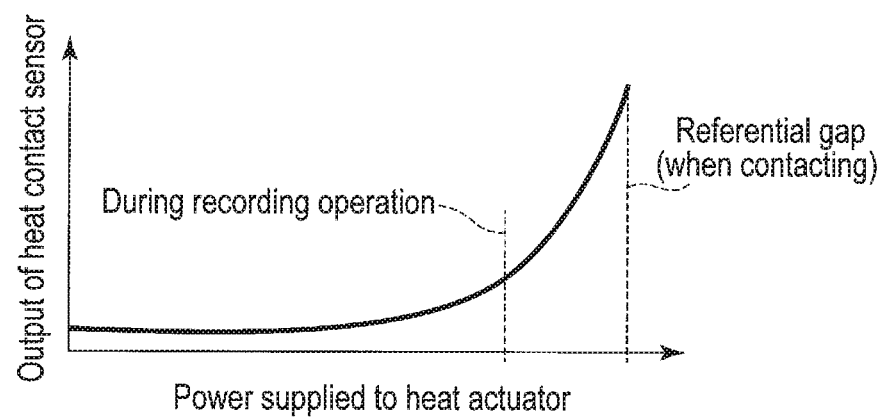
FIG. 26 is a diagram showing the relationship between the power supplied to a heat actuator and the output of a contact sensor in the third embodiment.

FIG. 22 is a side view schematically showing the head portion of the magnetic head according to the third embodiment in a touch operating state. FIG. 23 is a side view schematically showing the distal end portion of the recording head in the touch operating state. FIG. 24 is a side view schematically showing the head portion of the magnetic head according to the third embodiment after adjustment of the amount of protrusion. FIG. 25 is a side view schematically showing the head portion of the magnetic head according to the third embodiment during the recording operation. FIG. 26 is a diagram showing the relationship between the power supplied to the heat actuator and the output of the heat contact sensor in the third embodiment.

As shown in FIGS. 22 and 23, in the magnetic head of the third embodiment, when the first power (first control amount) supplied to the first heater 76a and the second power (second control amount) supplied to the second heater 76b are increased during the adjustment of the amount of gap, to increase the protrusion amount of the first protrusion PH1 and the second protrusion PH2, firstly, the end portion of the heat contact sensor 80 is brought into contact with the surface of the magnetic disk 12. During this period, if the heat contact sensor 80 is warmed up by supplying electricity from the main controller to the heat contact sensor 80, the temperature of the heat contact sensor 80 decreases as it approaches the magnetic disk, and as it touches the magnetic disk 12, the AC component of the electricity vibrates by contact. That is, when the heat contact sensor 80 contacts the magnetic disk 12, it outputs contact vibration to the main controller as a detection signal output. Thus, the main controller detects the contact of the second protrusion PH2 to the magnetic disk 12, to be able to accurately detect the first power value and the second power value at the time of contact.

Note that the memory of the main controller stores the heater power setting table indicates the relationship between the supplied power and the sensor output, illustrated in FIG. 26.

As shown in FIG. 24, after detecting the contact, the main controller adjusts the first power and the second power on the basis of the first power and the second power at the time of the contact, thereby setting the desired amount of gap. The main controller selects a desired sensor output from the heater power setting table, and reads a supplied power value corresponding to the selected sensor output. The main controller reduces the first power and the second power from the power values at the time of the contact, to the supplied power value read out, and decreases the amount of protrusion of the first protrusion PH1 and the second protrusion PH2. Thus, a predetermined gap between the magneto-resistive element 55 of the first protrusion PH1 and the surface of the magnetic disk is set, and at the same time, a predetermined gap between the distal end portion 60a of the main pole of the second protrusion PH2 and the surface of the magnetic disk is set. The supplied power value is stored in a memory as a setting power value for setting the gap.

As shown in FIG. 25, during the recording operation of the magnetic head 16, the main controller increases the first power value by a predetermined amount while maintaining the second power value, to change the ratio between the first power and the second power. The amount of swell out of the second protrusion PH2 of the recording head 58 increases, and thus the distal end portion 60a of the main pole 60 further approaches the surface of the magnetic disk. Thus, the gap between the distal end portion 60a of the main pole 60 and the surface of the magnetic disk decreases. Thus, the recording density, especially, linear recording density can be improved.

Note that the third embodiment, the other structural elements of the magnetic head 16 described above are the same as those of the magnetic head according to the first embodiment.

According to the third embodiment configured as described above, the contact between the magnetic head and the magnetic disk is detected by the contact sensor 80, and thus the first power value and the second power value at the time of contact, which can be used as the reference of adjustment of the gap, can be accurately detected. Based on the first power value and the second power value thus obtained, the gap between the magnetic head and the magnetic disk can be set with high precision.

While certain embodiments have been described, these embodiments have been presented by way of example only, and are not intended to limit the scope of the inventions. Indeed, the novel embodiments described herein may be embodied in a variety of other forms; furthermore, various omissions, and substitutions and changes in the form of the embodiments described herein may be made without departing from the spirit of the inventions. The accompanying claims and their equivalents are intended to cover such forms or modifications as would fall within the scope and spirit of the inventions.

For example, the recording heads of the magnetic heads according to the embodiments are applicable to a recording head without a leading shield and/or a side shield. Moreover, the recording head may be configured to comprise a high frequency oscillation element provided in the write gap. Furthermore, the materials, forms, sizes, etc., of the elements which constitute the head portion of the magnetic head can be changed as needed. In the magnetic disk device, the number of magnetic disks and magnetic heads may be increased or decreased as needed, and the size of the magnetic disks may be selected from various versions.

What is claimed is:

1. A magnetic head comprising:
    a slider comprising an air bearing surface including a trailing end and a leading end;
    a recording head provided in the slider and comprising a main pole including a distal end portion projecting from the air bearing surface and configured to generate a recording magnetic field, and a first shield including a distal end portion projecting from the air bearing surface and opposing a trailing side of the distal end portion of the main pole with a write gap therebetween;
    a read head provided in the slider and located on a side of the leading end with respect to the recording head;
    a first heat actuator provided in the slider and configured to control a protrusion amount of the recording head; and
    a second heat actuator provided in the slider and configured to control a protrusion amount of the read head;
    wherein
    the distal end portion of the first shield includes a distal end surface including a first shield edge opposing the distal end portion of the main pole with the write gap therebetween and a second shield edge spaced apart from the first shield edge on a side of the trailing end, and the distal end portion of the main pole is provided to project from the distal end surface, and
    when a length between the distal end portion of the main pole and the second shield edge is defined as L1, the projection amount of the distal end portion of the main pole from the distal end surface is defined as h2, a flying pitch of the magnetic head is defined as D1, and a protrusion pitch angle of the recording head is defined as D2 (including zero),
    the recording head satisfies a relationship of:

$$L1 \geq h2/(D1+D2).$$

2. The magnetic head of claim 1, wherein
    the recording head comprises a second shield including a distal end portion projecting from the air bearing surface and opposing a leading side of the distal end portion of the main pole with a gap therebetween, and
    the distal end portion of the second shield includes a distal end surface located substantially on a same plane as the distal end surface of the first shield.

3. The magnetic head of claim 2, wherein
the recording head comprises a third shield provided between the first shield edge of the first shield and the distal end portion of the main pole and opposing the trailing side of the distal end portion of the main pole with a write gap therebetween, and
when a length between the distal end portion of the third shield and the second shield edge is defined as L2, and the projection amount of the distal end portion of the third shield from the distal end surface is defined as h3, the recording head satisfies a relationship of:

$$L2 \geq h3/(D1+D2).$$

4. The magnetic head of claim 2, further comprising a contact sensor which detects contact of the recording medium to the recording head.

5. The magnetic head of claim 4, wherein
the contact sensor is provided at the distal end portion of the first shield, and includes an end portion adjacently located in the second shield edge to be contactable to the recording medium.

6. The magnetic head of claim 1, wherein
the recording head comprises a third shield provided between the first shield edge of the first shield and the distal end portion of the main pole and opposing the trailing side of the distal end portion of the main pole with a write gap therebetween, and
when a length between the distal end portion of the third shield and the second shield edge is defined as L2, and the projection amount of the distal end portion of the third shield from the distal end surface is defined as h3, the recording head satisfies a relationship of:

$$L2 \geq h3/(D1+D2).$$

7. The magnetic head of claim 1, further comprising a contact sensor which detects contact of the recording medium to the recording head.

8. The magnetic head of claim 7, wherein
the contact sensor is provided at the distal end portion of the first shield, and includes an end portion adjacently located in the second shield edge to be contactable to the recording medium.

9. A disk device comprising:
a rotatable disk-shaped recording medium including a magnetic recording layer;
the magnetic head of claim 1, which processes data with respect to the recording medium; and
a controller which controls the first heat actuator and the second heat actuator of the magnetic head.

10. The disk device of claim 9, wherein
the controller controls a protrusion shape of the recording head and the read head by the first heat actuator and the second heat actuator, sets a gap between the distal end portion of the recording head and the recording medium, and controls a protrusion shape of the recording head by the first actuator so that the distal end portion of the recording head approaches the recording medium further after setting the gap.

11. The disk device of claim 10, wherein
the controller controls the protrusion shape of the recording head and the read head by the first heat actuator and the second heat actuator, to bring the distal end portion of the recording head into contact with the recording medium, and adjusts control amounts of the first heat actuator and the second heat actuator with reference to control amounts of the first heat actuator and the second heat actuator when contacting, to set the gap.

12. The disk device of claim 9, wherein
the magnetic head further comprises a contact sensor which detects contact between the recording head and the recording medium.

\* \* \* \* \*